US012368760B2

(12) United States Patent
Rahman

(10) Patent No.: US 12,368,760 B2
(45) Date of Patent: *Jul. 22, 2025

(54) SYSTEMS AND METHODS FOR LIMITING NETWORK DISRUPTION

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,483

(22) Filed: May 4, 2023

(65) Prior Publication Data

US 2023/0275933 A1    Aug. 31, 2023

Related U.S. Application Data

(62) Division of application No. 17/196,579, filed on Mar. 9, 2021, now Pat. No. 11,659,010.

(51) Int. Cl.
*H04L 65/102* (2022.01)
*H04L 65/1016* (2022.01)
(Continued)

(52) U.S. Cl.
CPC ........ *H04L 65/1016* (2013.01); *H04L 65/102* (2013.01); *H04L 65/1045* (2022.05); *H04L 65/1073* (2013.01); *H04L 65/1104* (2022.05)

(58) Field of Classification Search
CPC ............. H04L 65/1016; H04L 65/1104; H04L 65/1045; H04L 65/102; H04L 65/1073; H04L 65/1046
See application file for complete search history.

(56) References Cited

U.S. PATENT DOCUMENTS

| 8,521,858 B2 * | 8/2013 | Shaikh | H04L 61/5007 709/227 |
| 9,001,730 B2 * | 4/2015 | Noldus | H04L 65/1073 455/433 |

(Continued)

OTHER PUBLICATIONS

Office Action (Notice of Allowance and Fees Due (PTOL-85)) dated Jan. 20, 2023 for U.S. Appl. No. 17/196,579 (pp. 1-5).

(Continued)

*Primary Examiner* — Syed Ali
(74) *Attorney, Agent, or Firm* — Lee & Hayes, P.C.

(57) ABSTRACT

A computer-implemented method of reducing disruption in a cellular network. The method includes receiving a node table including IMS nodes. The IMS nodes include nodes designated as voice nodes and nodes designated as message nodes. The method includes transmitting the node table to user devices in the cellular network, and receiving a first register request from a user device including an IP address of a message node. In response to receiving the first register request, the method includes transmitting the first register request to the IP address of the message node included in the first register request, and receiving a second register request from the user device, the second register request including an IP address of a voice node. The method includes transmitting the second register request to the IP address of the at least one of the one or more voice nodes included in the second register request.

18 Claims, 5 Drawing Sheets

(51) Int. Cl.
*H04L 65/1045* (2022.01)
*H04L 65/1073* (2022.01)
*H04L 65/1104* (2022.01)

(56) References Cited

U.S. PATENT DOCUMENTS

| | | | |
|---|---|---|---|
| 10,021,738 B1* | 7/2018 | Mehta | H04W 80/10 |
| 11,659,010 B2 | 5/2023 | Rahman | |
| 2007/0058789 A1* | 3/2007 | Lim | H04M 7/006 |
| | | | 379/88.17 |
| 2007/0213052 A1* | 9/2007 | Lim | H04L 65/1043 |
| | | | 455/435.1 |
| 2007/0259673 A1* | 11/2007 | Willars | H04L 65/1104 |
| | | | 455/450 |
| 2009/0215454 A1* | 8/2009 | Przybysz | H04W 60/00 |
| | | | 455/435.1 |
| 2010/0150137 A1* | 6/2010 | Lu | H04L 65/1016 |
| | | | 370/352 |
| 2011/0134843 A1* | 6/2011 | Noldus | H04L 65/1095 |
| | | | 370/328 |
| 2011/0202653 A1* | 8/2011 | Riley | H04L 43/028 |
| | | | 709/224 |
| 2015/0208446 A1* | 7/2015 | Yeoum | H04L 65/1073 |
| | | | 370/329 |
| 2015/0236915 A1* | 8/2015 | Mohammed | H04L 67/1036 |
| | | | 709/223 |
| 2016/0226923 A1* | 8/2016 | Purkop | H04L 65/103 |
| 2017/0026334 A1* | 1/2017 | Youn | H04L 61/5007 |
| 2017/0223526 A1* | 8/2017 | Posner | H04W 8/26 |
| 2018/0295665 A1* | 10/2018 | Lau | H04L 65/1046 |
| 2018/0309800 A1* | 10/2018 | Aravamudhan | H04M 15/65 |
| 2018/0359662 A1* | 12/2018 | Kim | H04W 36/0011 |
| 2019/0052572 A1* | 2/2019 | Naik | H04L 47/36 |
| 2021/0058435 A1* | 2/2021 | Sharma | H04L 65/1069 |
| 2021/0289371 A1* | 9/2021 | Bagwell | H04L 65/1045 |
| 2022/0294832 A1 | 9/2022 | Rahman | |

OTHER PUBLICATIONS

Office Action dated Jun. 27, 2022 for U.S. Appl. No. 17/196,579 (pp. 1-9).

* cited by examiner

SYSTEMS AND METHODS FOR LIMITING NETWORK DISRUPTION

CROSS-REFERENCE TO RELATED APPLICATIONS

This application is a divisional application of U.S. application Ser. No. 17/196,579, filed Mar. 9, 2021, the disclosure of which is incorporated by reference herein in its entirety.

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

Cellular network providers may provide various forms of communication options to their customers. For example, networks may provide voice communication, text communication, data access, etc. Traditionally, voice and messaging services may rely on the same network components. When errors occur that impact one of those services (e.g., messaging), voice service may be impacted as well due to the shared components. Systems are needed that may limit the disruptions resulting from those errors.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In an embodiment, the disclosure describes a system for routing real-time cellular network services. The system my include a voice call session control function (CSCF) including a voice proxy CSCF (P-CSCF) server, a voice interrogating CSCF (I-CSCF) server, and a voice serving CSCF (S-CSCF) server. The system may also include a message CSCF including a message proxy CSCF (P-CSCF) server, a message interrogating CSCF (I-CSCF) server, and a voice serving CSCF (S-CSCF) server. The system may also include a traffic node including one or more processors in communication with a memory containing processor-executable instructions to receive a register request from a user device. The register request may include one of a voice indicator or a message indicator. The memory also contains processor-executable instructions to identify whether the register request includes the voice indicator or the message indicator, and transmit the register request to the voice CSCF when the voice indicator is identified and transmit the register request to the message CSCF when the message indicator is identified.

In another embodiment, the disclosure a computer-implemented method for routing real-time cellular network services. The method may include receiving, at a traffic node, a first register request from a first user device. The first register request may include one of a voice indicator or a message indicator. The method may include determining, via one or more processors at the traffic node, that the first register request includes the voice indicator. Based on the determination that the first register request includes the voice indicator, the method may include transmitting the first register request to a voice call session control function (CSCF), where the voice CSCF may be configured to register user devices with voice application servers. The method may include receiving a second register request from a second user device, where the second register request may include one of the voice indicator or the message indicator. The method may include determining, via the one or more processors, that the second register request includes the message indicator. Based on the determination that the second register request includes the message indicator, the method may include transmitting the second register request to a message CSCF, where the message CSCF may be configured to register user devices with message application servers.

In another embodiment, the disclosure describes a computer-implemented method of reducing disruption in a cellular network. The method may include receiving, at a traffic node, a node table including a plurality of internet protocol (IP) multimedia core network subsystem (IMS) nodes. The plurality of IMS nodes may include one or more nodes designated as voice nodes and one or more nodes designated as message nodes. The method may include transmitting the node table to one or more user device devices in the cellular network, and receiving, at the traffic node, a first register request from a user device. The first register request may include an internet protocol (IP) address of at least one of the one or more message nodes. In response to receiving the first register request, the method may include transmitting, by the traffic node, the first register request to the IP address of the one or more message nodes included in the first register request. The method may include receiving, at the traffic node, a second register request from the user device, where the second register request may include an IP address of at least one of the one or more voice nodes. In response to receiving the second register request, the method may include transmitting, by the traffic node, the second register request to the IP address of the one or more voice nodes included in the second register request.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Network providers, such as entities providing cellular phone and data service, may use various hardware, software, or other tools and systems to provide various types of network services. For example, a cellular network may provide its customers access to voice services, messaging services, data services, etc. In some embodiments, the network infrastructure for providing one or more of these services may utilize common components. For example, some networks may use the same internet protocol (IP) multimedia core network subsystem (IMS or IMS core) to provide both messaging and voice services. In some embodiments, networks may use the same call session control function (CSCF) for both voice and messaging services.

Figure 1:
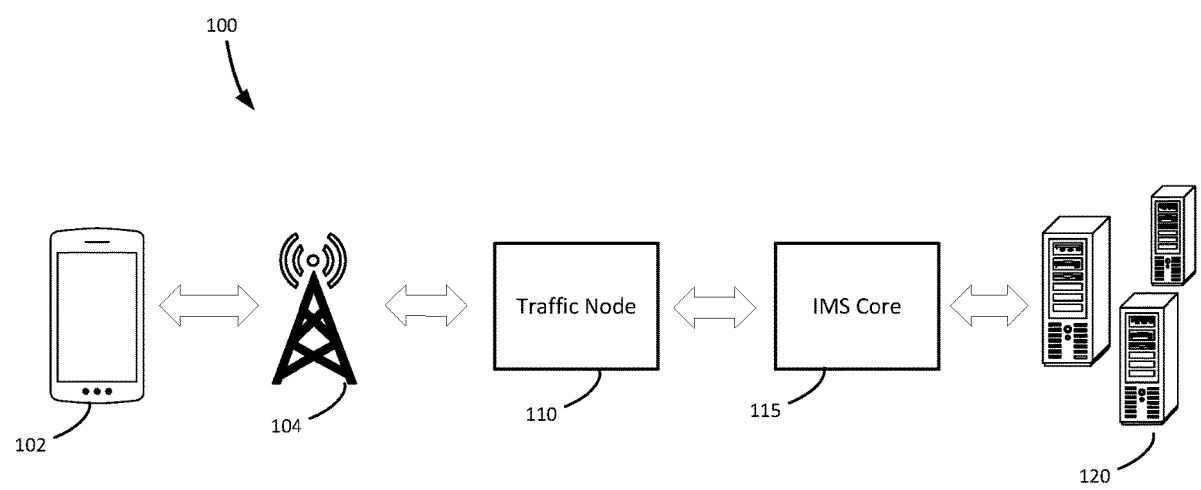
FIG. 1 is a high level diagram of an embodiment of a system for reducing network disruption in accordance with the disclosure.

FIG. 1 shows a high-level system diagram of a portion of a cellular network 100. In some embodiments, the user equipment (UE), such as a cellular telephone, tablet, or other connected device, may exchange signals with one or more base stations 104 within range. In some embodiments, the base station 104 may include E-UTRAN Node B) ("eNB" or "eNodeB) (e.g., for LTE networks), base transceiver station (BTS) (e.g., for GSM networks), Node B (e.g., for UTRA of UMTS), Home eNodeBs (HeNB), Donor eNodeBs (DeNB), and Relay Nodes, or other suitable hardware. The base station 104 may transmit signals to a traffic node 110, such as a packet data gateway (PGW) or a policy and charging rules function (PCRF). A UE 102 may have simultaneous connectivity with more than one PGW or other traffic node for accessing multiple packet data networks (PDNs). In some embodiments, the PGW may perform policy enforcement, packet filtering for each user, charging support, lawful interception and packet screening. The PGW may also act as the anchor for mobility between 3rd generation partnership project (3GPP) and non-3GPP technologies such as WiMAX and 3GPP2 (CDMA 1x and EvDO). The PGW may interface with one or more serving gateways (SGWs) via the S5/S8 protocol, for example. In some embodiments, the traffic node 110 may include a gateway General Packet Radio Service (GPRS) support node (GGSN) instead of a PGW and a serving GPRS support node (SGSN) instead of an SGW. In such embodiments, the GGSN may be responsible for the interworking between the GPRS network and external packet switched networks, like the Internet and X.25 networks. In some embodiments, such as 5G network embodiments, the traffic node may be replaced by a session management function (SMF). In some embodiments, the traffic node 110 may direct traffic to particular components within the IMS core 115, such as a Call Session Control Function (CSCF). The components within the IMS core 115 may then interface with the appropriate application servers 120 depending on the particular type of service requested by the UE 102. For example, in some embodiments, the IMS core 115 components may register with a telephony application server (TAS) or other voice application server for voice services or with a messaging server for messaging services (e.g., rich communication services (RCS), etc.).

Traditionally, in some embodiments, the same one or more CSCFs within the IMS core 115 may be used to handle both message services requested by the UE 102 and voice services requested by the UE 102. In such embodiments, same one or more CSCFs may register a UE with the appropriate application servers. Traditionally, when a problem arises with one of these services, such as voice services, the problem may spill over into the messaging services and disrupt both voice and messaging services instead of only voice services. For example, user equipment may attempt to make a voice call and if it fails, it may automatically redial, or the user may manually redial once or multiple times. If many users at once are experiencing the same failures resulting from an underlying problem with the voice service, the repeated attempts and failures to connect may increase the load on system and to the IMS core components such that message services may be interrupted also even if no underlying problem with the messages system had been present. Accordingly, in some traditional systems, problems with one service (e.g., messaging or voice), may cascade over into other services as the common components (e.g., CSCFs) may be overwhelmed and users may be unable to access either voice or message services. A similar situation may occur based on an underlying problem with the messaging service as many user's devices may make repeated attempts to transmit message information upon failure.

In some embodiments, the disclosure describes a system and method for reducing network disruption that may include de-coupling the common network nodes that handle registering voice services with voice application servers and that handle registering messaging services with messaging services. For example, in some embodiments, the system may include establishing one or more voice nodes (e.g., voice CSCFs that may only handle voice services) and one or more messaging nodes (e.g., messaging CSCFs) that may only handle messaging services. In some embodiments, when a user attempts to send a message using the messaging service, a traffic node may determine that the message services are being requested and route the request to a messaging CSCF for registration with a messaging application server. In contrast, when a user attempts to make a voice call using the network's voice services, the traffic node may determine that voice services are being requested and route the request to a voice CSCF for registration with a voice application server. In some embodiments, other types of services may be included with dedicated components as well.

In some embodiments, the network provider may determine how to distribute messaging nodes and voice nodes in the system. Depending on how the network provider anticipates users to utilize the network (based on past usage data or other analysis), the network provider may dedicate a messaging proportion of CSCFs and a voice proportion of CSCFs. For example, a geographic area served by the network provider may include a network infrastructure with 100 total CSCFs included in the IMS core. Based on historic network usage data, the network provider may determine that 60 of the 100 CSCFs should be messaging CSCFs and 40 of the 100 CSCFs should be voice CSCFs. In such an embodiment, the messaging proportion would be 60%, and the voice proportion would be 40%. Of course, those skilled in the art will understand that other proportions may be used based on any variety of network or business factors.

Figure 2:
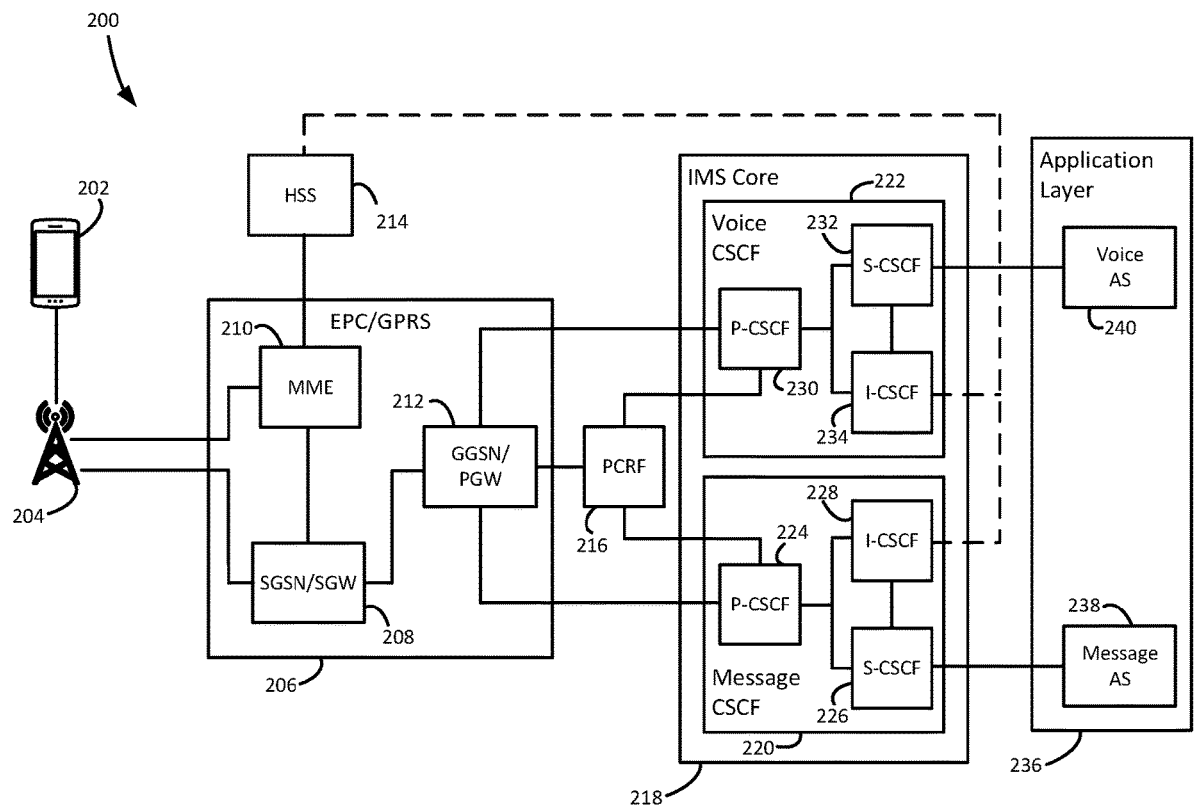
FIG. 2 is a high level diagram of an embodiment of a network environment for a system and methods for reducing network disruption in accordance with the disclosure.

FIG. 2 is a system component diagram of illustrating an embodiment of a system for reducing network disruption. The system 200 may include user equipment (UE) 202, such as a mobile phone or smartphone, tablet, etc., may transmit a signal to one or more network base stations 204. In some embodiments, such as for long term evolution (LTE) networks, the base station 204 may connect the UE 202 to a the evolved packet core (EPC) 206, which may include at least a serving gateway (SGW) 208, a mobile management entity (MME) 210, and a PGW 212. The EPC 206 may also include a home subscriber server (HSS) 214. It should be understood by those skilled in the art that other types of networks may include corresponding components. For example, in embodiments that include a GSM network, a GPRS may be used instead of or in addition to an EPC. The GPRS may support packet switching traffic in a GSM network. The GPRS may include a gateway GPRS support node (GGSN) instead of a PGW and a serving GPRS support node (SGSN) 208 instead of an SGW.

The PGW 212 may interface with a policy and charging rules function (PCRF) 216. The PCRF 216 may include rules and policies related to quality of service (QoS) and charging. In some embodiments, access to network resources may be distributed to the PGW 121 and enforced by the PCRF 216. The PCRF 216 may interface with the PGW 212 using the Gx protocol. In some embodiments, the PCRF 216 may be a software node designated in real-time to determine policy rules in the network. The PCRF 216 may be a software component that may operate at the core network 206 and may access subscriber databases and other specialized functions, such as a charging system, in a centralized manner. The PCRF 216 may be the part of the network architecture that aggregates information to and from the network, operational support systems, and other sources (such as portals) in substantially real time, supporting the creation of rules and then automatically making policy decisions for each subscriber active on the network. In some embodiments, a network might offer multiple services, quality of service (Qos) levels, and charging rules. The PCRF 216 may also be integrated with different platforms like billing, rating, charging, and subscriber database or can also be deployed as a standalone entity. In voice over LTE (VOLTE), the PCRF 216 may also be a mediator of network resources for the network for establishing the calls and allocating the requested bandwidth to the call bearer with configured attributes. For any given attempt to access the network, either for a voice call or data transfer, the PGW 212 may have one or more PCRF 216 options with which to interface.

The PGW 212 may also act as a traffic node between the UE 202 and the IMS core 218. The IMS core 218 may include one or more CSCFs, one or more of which may be designated as message CSCFs 220 and one or more of which may be designated as voice CSCF 222. Each CSCF may have a proxy CSCF (P-CSCF), an interrogating CSCF (I-CSCF), and a serving CSCF (S-CSCF). The P-CSCF may be a Session Initiated Protocol (SIP) proxy that may be the first point of contact for the IMS core 218. The P-CSCF may function as a proxy server for the UE, and all SIP signaling traffic to and from the UE may go through the P-CSCF. The P-CSCF may and then forward requests from the UE and then process and forward the responses to the UE. The I-CSCF may interrogate the HSS 214 to obtain the address of the relevant S-CSCF to process a SIP initiation request. The S-CSCF may be the primary node in the IMS core 218 responsible for session control. Users may be allocated a S-CSCF for the duration of their IMS registration in order to facilitate routing of SIP messages as part of service establishment procedures. Consequently, the S-CSCF may download a subscriber profile from the HSS 214 at the time of registration, which may allow the S-CSCF to ascertain which application server in the application layer 236 to which any service requests should be sent. For example, message requests may be sent to the message application server (AS) 238, and voice requests may be sent to the voice AS 240.

In some embodiments, each message CSCF 220 may include a message P-CSCF 224, a message S-CSCF 226, and a message I-CSCF 228. In some embodiments, each voice CSCF 222 may include a voice P-CSCF 230, a voice S-CSCF 232, and a voice I-CSCF 234. In some embodiments, the traffic node (e.g., PGW 212) may receive a register request from UE 202 via the one or more base stations 204 or other network components. The register request may include one of a voice indicator or a message indicator. In some embodiments, the voice indicator may be one of a variety of flags, markers, or other data indicator in the register request that indicates to the PGW 212 that the user may be attempting to make a voice call connection. The message indicator may be one of a variety of flags, markers, or other data indicator in the register request that indicates to the PGW 212 that the user may be attempting to send a message, such as a text message or multimedia message. Upon identifying whether the register request includes either a voice indicator or a message indicator, the PGW 212 may determine which type of CSCF to which the request should be sent. If the PGW 212 identifies a voice indicator, the PGW may transmit the register request to one of a plurality of voice CSCFs, such as the voice CSCF 222. More specifically, the PGW 212 may transmit the request to the voice P-CSCF 230. The voice I-CSCF 234 may interrogate the HSS 214 to determine which voice S-CSCF to use, such as voice S-CSCF 232. The designated voice S-CSCF 232 may then register the request with an appropriate AS in the application layer 236, such as voice AS 240.

A similar process may occur when the PGW 212 identifies that the register request includes a message identifier. If the PGW 212 identifies a message indicator, the PGW may transmit the register request to one of a plurality of message CSCFs, such as the message CSCF 220. More specifically, the PGW 212 may transmit the request to the message P-CSCF 224. The message I-CSCF 228 may interrogate the HSS 214 to determine which message S-CSCF to use, such as message S-CSCF 226. The designated message S-CSCF 226 may then register the request with an appropriate AS in the application layer 236, such as message AS 238.

In some embodiments that include one or more designated message CSCFs 220 and one or more separate designated voice CSCFs 222, problems that affect the voice services for the network may not spill over into the message services. For example, if the voice services encounter a problem that leads to many voice calls failing, the load on the voice CSCFs may increase (as described above), but because they may be separate from the message CSCFs, the load may not spill over into the message service. In other words, the problem with the voice service may be contained within the voice system only, not affect the message system as it may have done in traditional systems. Similarly, if a problem occurs in the message service, the problem may be restricted to message services and not spill over into the voice service. Thus, in some embodiments, the disclosed system and method may provide one aspect of a network (e.g., messages) to remain functional if another aspect (e.g., voice) encounters problems.

Figure 3:
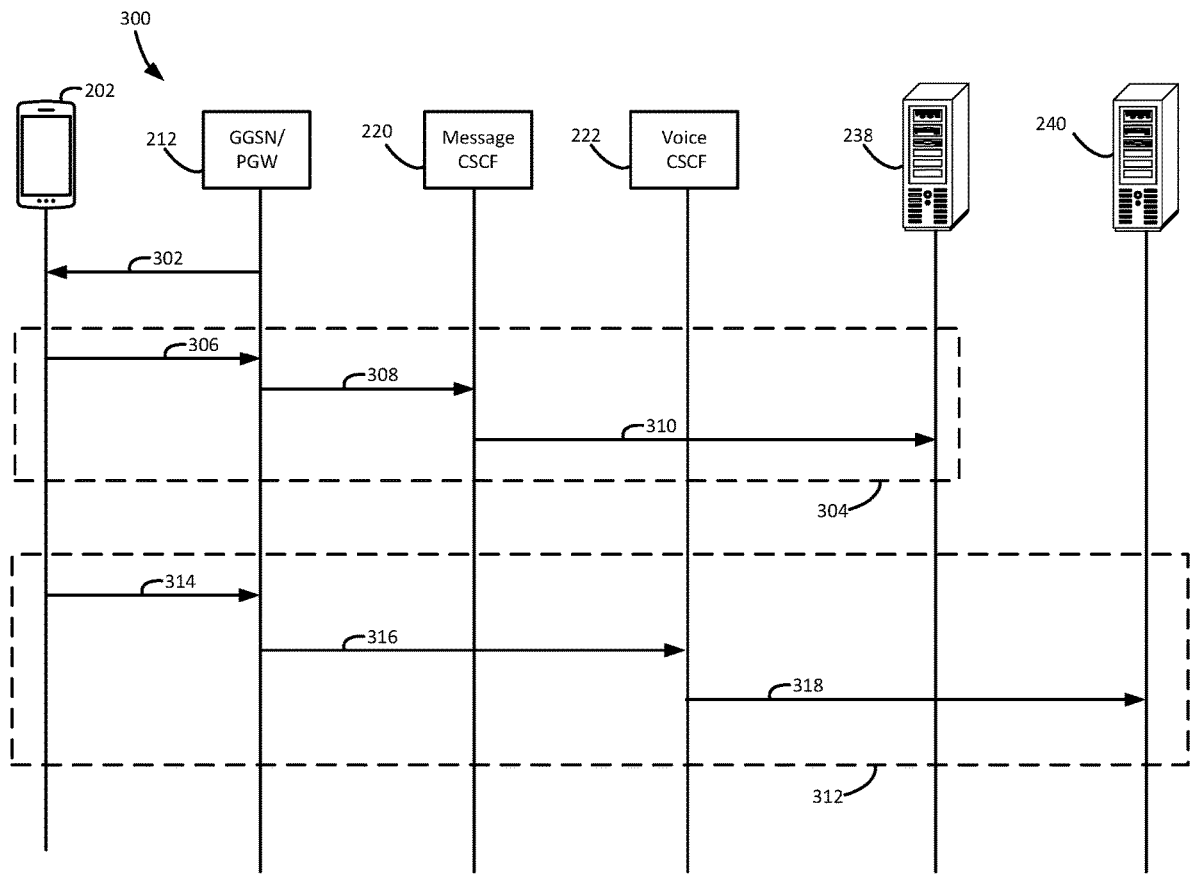
FIG. 3 is a data flow diagram of an embodiment of using the system for reducing network disruption of FIG. 1.

FIG. 3 shows a data flow diagram 300 of an embodiment of how data for real-time cellular activity may be routed from different components in some embodiments of the system for limiting network disruption. In some embodiments, the network provider may design the network or a portion of the network with certain CSCFs designated as voice CSCFs and certain CSCFs designated as message CSCFs. This information may be included in a node table and injected into the PGW 212. In some embodiments, the node table may include the IP addresses for each CSCF along with a tag or other indicator of whether each particular CSCF is a voice CSCF or a message CSCF. More particularly, the IP address included in the node table may be the IP address for the P-CSCF for each particular voice or message CSCF. Table 1, below, illustrates one merely exemplary embodiment of a node table:

TABLE 1

| 1 | Message P-CSCF | IP Address 1 |
|---|---|---|
| 2 | Voice P-CSCF | IP Address 2 |
| 3 | Message P-CSCF | IP Address 3 |
| 4 | Voice P-CSCF | IP Address 4 |

At 302, the PGW 212 may transmit the node table to each UE 202 in the network or in the portion of the network serviced by that PGW. The UE 202 may then proceed with a message flow 304 or a voice flow 312, depending on whether the user is choosing to send a message or connect for a voice call, respectively. At 306, when the user attempts to use the UE 202 to send a message, the UE may transmit a register request to the PGW 212. In some embodiments, the register request may include a protocol configuration option (PCO) that, based on the node table receive from the PGW, may include the IP address or addresses for one or more message P-CSCFs. In some embodiments, the register request sent by the UE 202 may include a priority list of P-CSCFs tagged with a message indicator. In some embodiments, the UE 202 may only send IP addresses of message P-CSCFs based on the UE's knowledge that it is sending a message. At 308, based on the indication that the register request included a message indicator, or based on the IP address for message P-CSCFs received from the UE 202, the PGW 212 may transmit the register request to the first message CSCF 220 on the list, or the second or third if the first is not available. In some embodiments, the register request may be sent to the message CSCF 220 via SIP. Once the message P-CSCF in the message CSCF 220 receives the SIP request, the other components of the message CSCF may complete additional standard protocols and, at 310, may transmit the request to the appropriate application server, such as the message application server 238 so that the user's message may be transmitted to its recipient.

The voice flow 312 may work in a similar manner for voice service. At 314, when the user attempts to use the UE 202 to make a voice call, the UE may transmit a register request to the PGW 212. In some embodiments, the register request may include a protocol configuration option (PCO) that, based on the node table receive from the PGW, may include the IP address or addresses for one or more voice P-CSCFs. In some embodiments, the register request sent by the UE 202 may include a priority list of P-CSCFs tagged with a voice indicator. In some embodiments, the UE 202 may only send IP addresses of voice P-CSCFs based on the UE's knowledge that it is making a voice call. At 316, based on the indication that the register request included a voice indicator, or based on the IP address for voice P-CSCFs received from the UE 202, the PGW 212 may transmit the register request to the first voice CSCF 222 on the list, or the second or third if the first is not available. In some embodiments, the register request may be sent to the voice CSCF 222 via SIP. Once the voice P-CSCF in the voice CSCF 222 receives the SIP request, the other components of the voice CSCF may complete additional standard protocols and, at 318, may transmit the request to the appropriate application server, such as the voice application server 240 so that the user's voice call may be connected with its recipient. Those of skill in the art will understand that other known protocols and data flow between standard components and network nodes may also take place but that are not shown or described in the figures herein.

Figure 4:
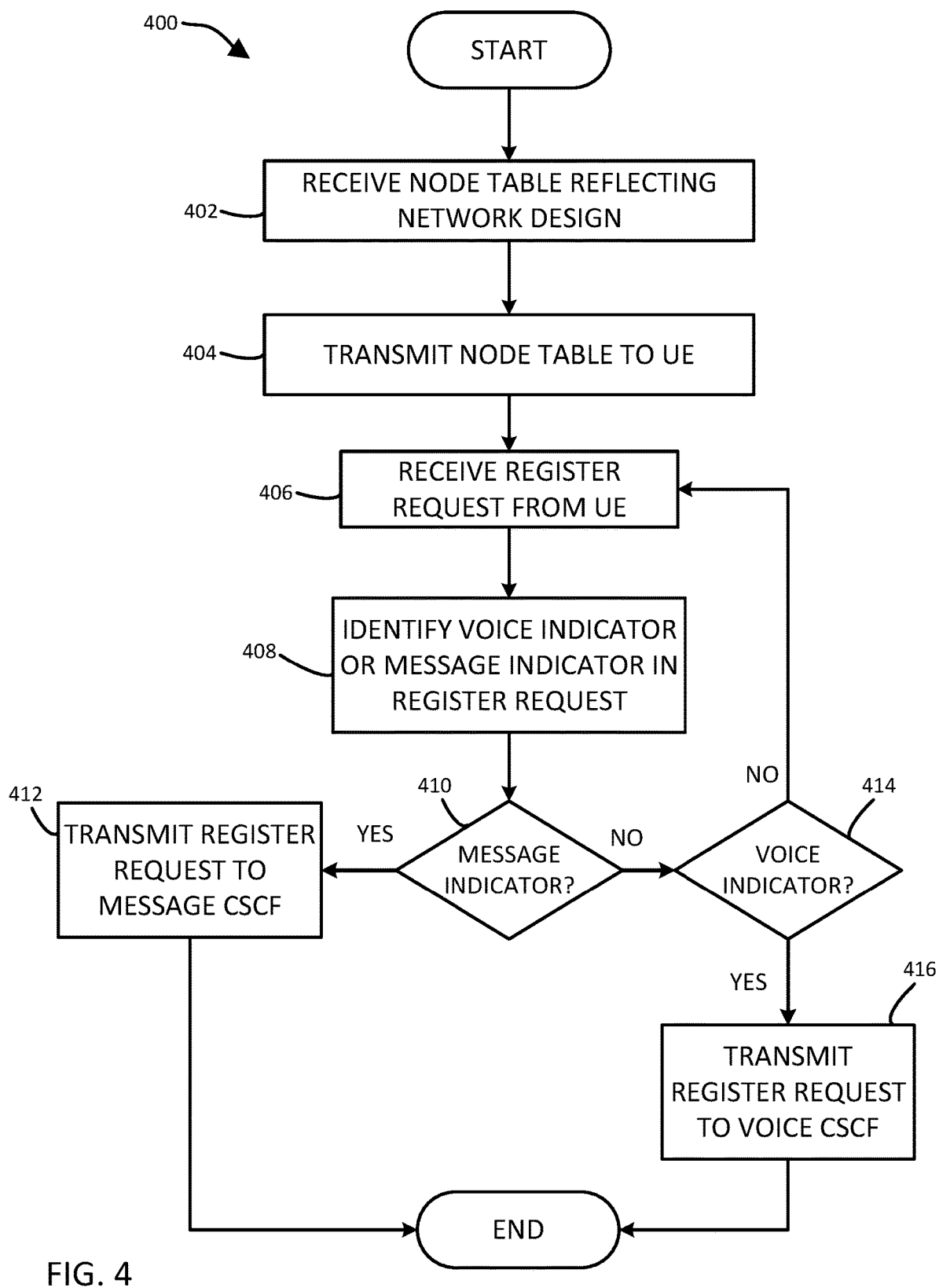
FIG. 4 is a flowchart of an embodiment of a method of reducing network disruption using the system of FIG. 1.

FIG. 4 is a flow chart of an embodiment of a method 400 of using the system for limiting network disruption. At 402, the traffic node (e.g., PGW, GGSN, etc.) that may be part of the network's packet core may receive a node table that may include designations for at least portion of the network' CSCFs or P-CSCFs as either message CSCFs or voice CSCFs. It is also contemplated that, in some embodiments, additional services than voice and data may also receive CSCFs with separate or additional designations. The designations in the node table may be received from the network provider, and may reflect automatically or manually determined network design priorities that may be based on historic usage of each respective service. For example, a network or portion of a network that may be used more for messaging than voice services may be designed with more message CSCFs than voice CSCFs. In some embodiments, the node table may be updated periodically based on network loads, network usage, etc. In some embodiments, the updates may be injected manually, or may be determined automatically based on predetermined criteria, such as message volume, voice call volume, or other network data. At 404, the method may include transmitting the node table (or the data in the node table) to one or more UEs on the network. In some embodiments, each UE may be assigned or connected to more than one traffic node, and the UEs may change over time. It should be understood that the node table may be transmitted to the UEs through one or more base stations or other network infrastructure.

At 406, the method may include receiving a request from a UE to initiate a type of service via the network. For example, the user may be attempting to send a text or multimedia message, initiate a voice call, etc. In some embodiments, this request may be a register request from a UE, such as a user's mobile computing device or any other device on the network. The register request (or other form of request) may be made using one of any number of suitable protocols or communication methods. For example, the register request may be made using SIP or via a packet data network (PDN) connectivity request. In some embodiments, the register request may include a protocol configuration option (PCO) that may include one or more IP addressed for IMS core components such as a P-CSCF. The register request may include an indicator as to which type of service the UE may be attempting to access (e.g., message, voice, data, etc.). As described above, the type of service may be indicated in a variety of suitable ways, such as via a node table identifying a priority of IMS core components to contact. For example, the register request may include a priority list of message P-CSCFs for a message request, or include a priority list of voice P-CSCFs for a voice call request. In some embodiments, the request may include another type of indicator detectable by the traffic node that indicates to the traffic node which type of service is being requested.

At 408, the method may include identifying whether a voice indicator or a message indicator may be present in the register request. At 410, if a message indicator is determined to be present, the traffic node may, at 412, transmit the register request to a message CSCF or, more specifically, the IP address of a designated message P-CSCF indicated in a the request, such as in the PCO. In some embodiments, the register request transmitted to the message CSCF may be a SIP message. If, at 410, the traffic node determines that no message indicator is present then, at 414, the traffic node may determine whether a voice indicator is present in the register request. If yes, then at 416, the method may include transmitting the register request to a voice CSCF or, more specifically, the IP address of a designated voice P-CSCF indicated in a the request, such as in the PCO. In some embodiments, the register request transmitted to the voice CSCF may be a SIP message. It should be understood by those skilled in the art that various alternative methods for identifying, choosing, and transmitting service initiation requests from a UE to an appropriate CSCF designated specifically for the requested service may also be used without straying from the spirit of the disclosure.

At least one technical effect of the disclosed system and methods may be to significantly reduce network downtime and/or the risk of errors occurring related to one network service (e.g., voice calls) spilling over to and negatively affecting other network service (e.g., messaging). In some embodiments, additional types of services may be designated in a similar manner within the meaning of the disclosure. Although the disclosure describes use with traffic nodes such as PGWs and IMS core components such as CSCFs, those skilled in the art will understand that the teachings of the disclosure may apply to other suitable network components that may encounter similar problems and be amenable to similar solutions within the meaning of the disclosure.

Figure 5:
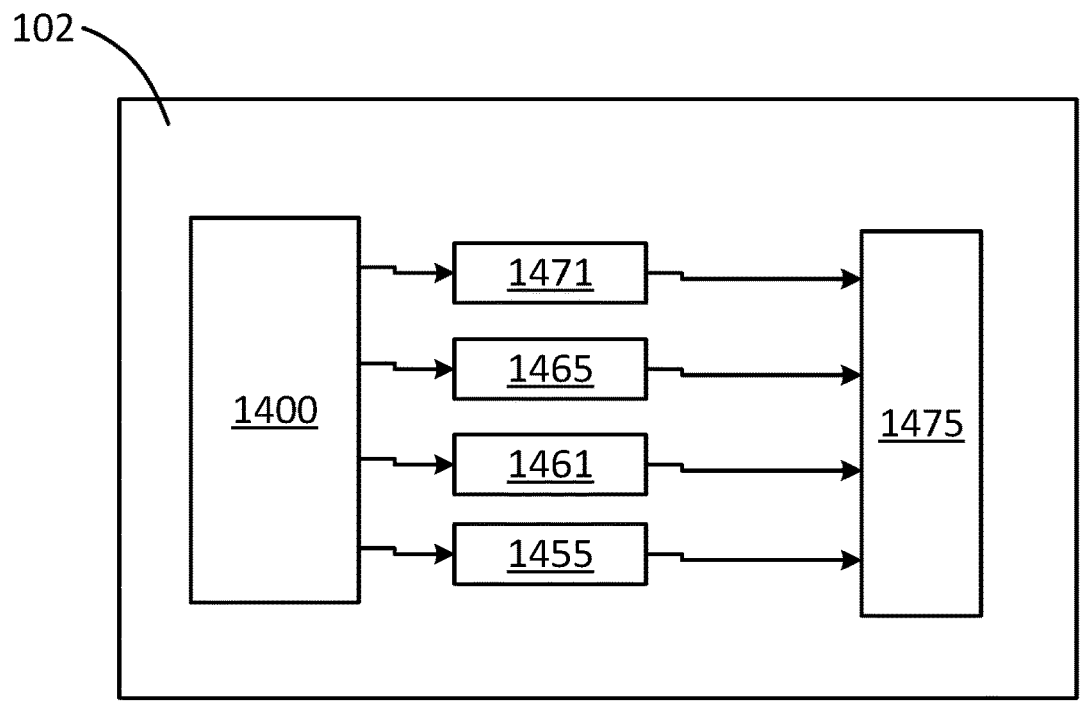
FIG. 5 is a schematic illustration of elements of an embodiment of an example computing device.
Figure 6:
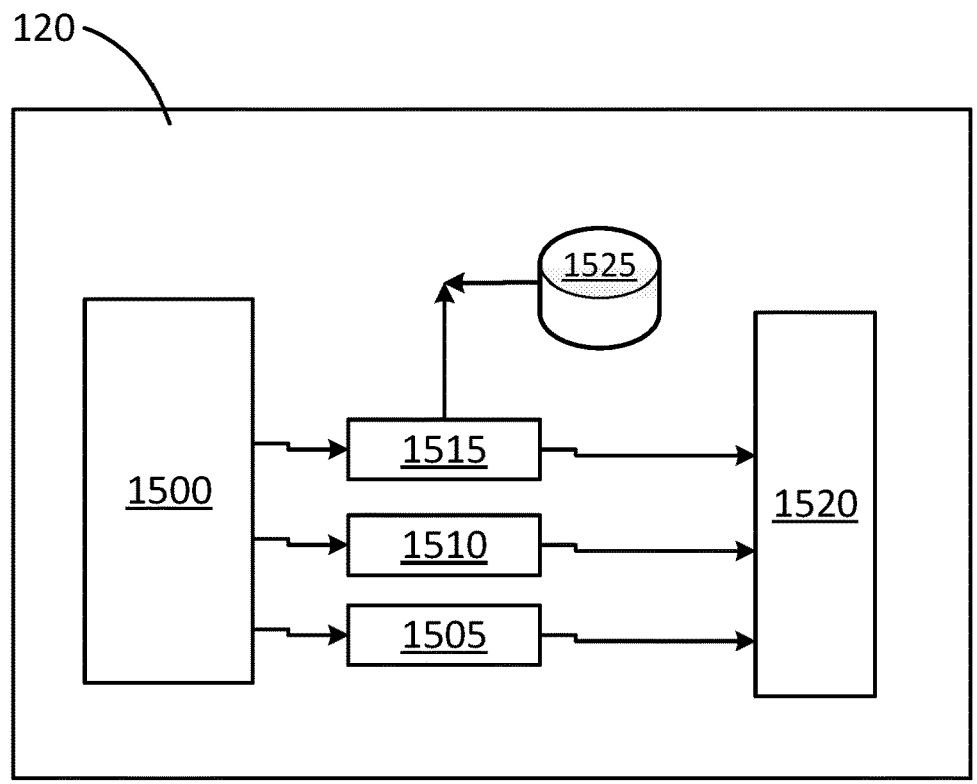
FIG. 6 is a schematic illustration of elements of an embodiment of a server type computing device.

FIG. 5 is a simplified illustration of some physical elements that may make up an embodiment of a computing device, such as the UE 102, and FIG. 6 is a simplified illustration of the physical elements that make up an embodiment of a server type computing device, such as may be used for the application servers 120, the voice and messaging CSCFs, or other network nodes. Referring to FIG. 5, a sample computing device is illustrated that is physically configured to be part of the systems and method for reducing network disruptions. The computing device 102 may have a processor 1451 that is physically configured according to computer executable instructions. In some embodiments, the processor may be specially designed or configured to optimize communication between a server relating to the system described herein. The computing device 102 may have a portable power supply 1455 such as a battery, which may be rechargeable. It may also have a sound and video module 1461 which assists in displaying video and sound and may turn off when not in use to conserve power and battery life. The computing device 102 may also have volatile memory 1465 and non-volatile memory 1471. The computing device 102 may have GPS capabilities that may be a separate circuit or may be part of the processor 1451. There also may be an input/output bus 1475 that shuttles data to and from the various user input/output devices such as a microphone, a camera, a display, or other input/output devices. The computing device 102 also may control communicating with networks either through wireless or wired devices. Of course, this is just one embodiment of a computing device 102 and the number and types of computing devices 102 is limited only by the imagination.

The physical elements that make up an embodiment of a server, such as the application servers 120 or traffic node 212, are further illustrated in FIG. 6. In some embodiments, the traffic node server may be specially configured to run the system and methods for reducing network disruptions as disclosed herein. At a high level, the server 120 may include a digital storage such as a magnetic disk, an optical disk, flash storage, non-volatile storage, etc. Structured data may be stored in the digital storage a database. More specifically, the server 120 may have a processor 1500 that is physically configured according to computer executable instructions. In some embodiments, the processor 1500 can be specially designed or configured to optimize communication between a computing device, such as computing device 102, or between other system nodes such as a requesting node, and the server 120 relating to the system as described herein. The server 120 may also have a sound and video module 1505 which assists in displaying video and sound and may turn off when not in use to conserve power and battery life. The server 120 may also have volatile memory 1510 and non-volatile memory 1515.

A database 1525 for digitally storing structured data may be stored in the memory 1510 or 1515 or may be separate. The database 1525 may also be part of a cloud of servers and may be stored in a distributed manner across a plurality of servers. There also may be an input/output bus 1520 that shuttles data to and from the various user input devices such as a microphone, a camera, a display monitor or screen, etc. The input/output bus 1520 also may control communicating with networks either through wireless or wired devices. In some embodiments, a user data controller for running a user data API may be located on the computing device 102. However, in other embodiments, the user data controller may be located on server 120, or both the computing device 102 and the server 120. Of course, this is just one embodiment of the server 120 and additional types of servers are contemplated herein.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer-implemented method of reducing disruption in a cellular network, the method comprising:
   receiving, at a traffic node, a node table including a plurality of internet protocol (IP) multimedia core network subsystem (IMS) nodes of a plurality of call session control functions (CSCFs), the plurality of CSCFs including a first CSCF specific to message services and a second CSCF specific to voice services;
   transmitting the node table to one or more user devices in the cellular network;
   receiving, at the traffic node, a first register request from a user device, the first register request including an internet protocol (IP) address of at least one of the one or more IMS nodes of the first CSCF that is specific to message services;
   in response to receiving the first register request, transmitting, by the traffic node, the first register request to the IP address of the at least one of the one or more IMS nodes of the first CSCF included in the first register request;
   receiving, at the traffic node, a second register request from the user device, the second register request including an IP address of at least one of the one or more IMS nodes of the second CSCF that is specific to voice services; and
   in response to receiving the second register request, transmitting, by the traffic node, the second register request to the IP address of the at least one of the one or more IMS nodes of the second CSCF included in the second register request.

2. The method of claim 1, wherein the traffic node is a provisioning gateway (PGW).

3. The method of claim 1, wherein each of the first CSCF and the second CSCF includes a proxy CSCF (P-CSCF), and wherein the IP address included in the first register request is the IP address of a message P-CSCF and the IP address included in the second register request is the IP address of a voice P-CSCF.

4. The method of claim 1, wherein the register request is a packet data network (PDN) connectivity request.

5. The method of claim 1 further comprising periodically receiving, at the traffic node, updated node tables.

6. A computer-implemented method comprising:
   receiving a node table including a plurality of call session control functions (CSCFs) in a cellular network, the plurality of CSCFs including at least a first CSCF specific to message services and at least a second CSCF specific to voice services;
   transmitting the node table to one or more user devices in the cellular network;
   receiving a first register request from a user device, the first register request including an internet protocol (IP) address of the at least one node of the first CSCF that is specific to message services;
   in response to receiving the first register request, transmitting the first register request to the IP address of the at least one node of the first CSCF;
   receiving a second register request from the user device, the second register request including an IP address of the at least one node of the second CSCF that is specific to voice services; and
   in response to receiving the second register request, transmitting the second register request to the IP address of the at least one node of the second CSCF.

7. The method of claim 6, wherein the node table is received by a traffic node of the cellular network.

8. The method of claim 7, wherein the traffic node is a provisioning gateway (PGW).

9. The method of claim 6, wherein each of the first CSCF and the second CSCF includes a proxy CSCF (P-CSCF), and wherein the IP address included in the first register request is the IP address of a message P-CSCF and the IP address include in the second register request is the IP address of a voice P-CSCF.

10. The method of claim 6, wherein the register request is a packet data network (PDN) connectivity request.

11. The method of claim 6 further comprising periodically receiving updated node tables reflecting updated designations of message nodes and voice nodes.

12. The method of claim 6, wherein the at least one node of the first CSCF and the at least one node of the second CSCF are each internet protocol multimedia subsystem nodes.

13. A computer-implemented method comprising:
   receiving, at a traffic node of a cellular network, a node table including one or more nodes of a first call session control function (CSCF) and one or more nodes of a second CSCF, wherein the first CSCF is specific to message services and the second CSCF is specific to voice services;
   transmitting the node table to one or more user devices in the cellular network;
   receiving, at the traffic node, a first register request from a user device, the first register request identifying a node of the one or more nodes of the first CSCF;
   in response to receiving the first register request, transmitting, by the traffic node, the first register request to the node of the one or more nodes of the first CSCF;
   receiving, at the traffic node, a second register request from the user device, the second register request identifying a node of the one or more nodes of the second CSCF; and
   in response to receiving the second register request, transmitting, by the traffic node, the second register request to the node of the one or more nodes of the second CSCF.

14. The method of claim 13, wherein the traffic node is a provisioning gateway (PGW).

15. The method of claim 13, wherein the first CSCF includes a message proxy call session control function (P-CSCF), and the second CSCF includes a voice P-CSCF.

16. The method of claim 13, wherein the register request is a packet data network (PDN) connectivity request.

17. The method of claim 13 further comprising periodically receiving, at the traffic node, updated node tables.

18. The method of claim 13, wherein the one or more nodes of the first CSCF and the one or more nodes of the second CSCF are each an internet protocol multimedia subsystem node.

* * * * *